US012566528B1

(12) United States Patent
Varrato

(10) Patent No.: US 12,566,528 B1
(45) Date of Patent: Mar. 3, 2026

(54) OPTICAL PRESSURE SENSOR OF A CAPACITANCE MODULE

(71) Applicant: Cirque Corporation, Sandy, UT (US)

(72) Inventor: Steven Varrato, South Jordan, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 19/075,464

(22) Filed: Mar. 10, 2025

(51) Int. Cl.
    *G06F 3/044* (2006.01)
    *G06F 3/01* (2006.01)
    *G06F 3/042* (2006.01)

(52) U.S. Cl.
    CPC ............ *G06F 3/0447* (2019.05); *G06F 3/016* (2013.01); *G06F 3/0421* (2013.01); *G06F 3/0446* (2019.05); *G06F 2203/04106* (2013.01); *G06F 2203/04107* (2013.01); *G06F 2203/04111* (2013.01)

(58) Field of Classification Search
    CPC ...... G06F 3/0447; G06F 3/016; G06F 3/0421; G06F 3/0446; G06F 2203/04106; G06F 2203/04107; G06F 2203/04111
    See application file for complete search history.

(56) References Cited

U.S. PATENT DOCUMENTS

| | | | |
|---|---|---|---|
| 5,157,372 A | 10/1992 | Langford | |
| 5,917,180 A * | 6/1999 | Reimer | ..................... G01L 1/24 |
| | | | 250/227.14 |

| | | | |
|---|---|---|---|
| 6,523,414 B1 * | 2/2003 | Malmstrom | .......... G01L 9/0007 |
| | | | 73/705 |
| 9,250,754 B2 | 2/2016 | Tenuta | |
| 10,296,091 B2 | 5/2019 | Heubel | |
| 10,353,506 B2 | 7/2019 | Vosgueritchian | |
| 11,385,718 B2 | 7/2022 | Glad | |
| 2011/0141052 A1 | 6/2011 | Bernstein | |
| 2012/0020045 A1 | 1/2012 | Tanase | |
| 2012/0040721 A1 | 2/2012 | Infanti | |
| 2014/0002113 A1 * | 1/2014 | Schediwy | ............. G06F 3/0446 |
| | | | 324/661 |
| 2014/0368455 A1 | 12/2014 | Croisonnier | |
| 2015/0243457 A1 | 8/2015 | Niu | |
| 2016/0038030 A1 * | 2/2016 | Smith | ................ A61B 5/02154 |
| | | | 600/478 |
| 2019/0294275 A1 * | 9/2019 | Ko | ......................... G06F 3/0418 |
| 2020/0379606 A1 * | 12/2020 | Glad | ..................... G06F 3/0446 |

* cited by examiner

*Primary Examiner* — Antonio Xavier

(57) ABSTRACT

A capacitance module may include a stack of layers, a capacitance measuring circuit disposed on at least on of the layers of the stack of layers, the capacitance measuring circuit defining a capacitance input sensitive area associated with a face of the at least one layer, an optical pressure sensor incorporated into the stack of layers aligned within the input sensitive area, and a controller in communication with the capacitance measuring circuit and the optical pressure sensor, where the optical pressure sensor is configured to detect deformation from a user input to the stack of layers within the capacitance input sensitive area.

18 Claims, 17 Drawing Sheets

2500

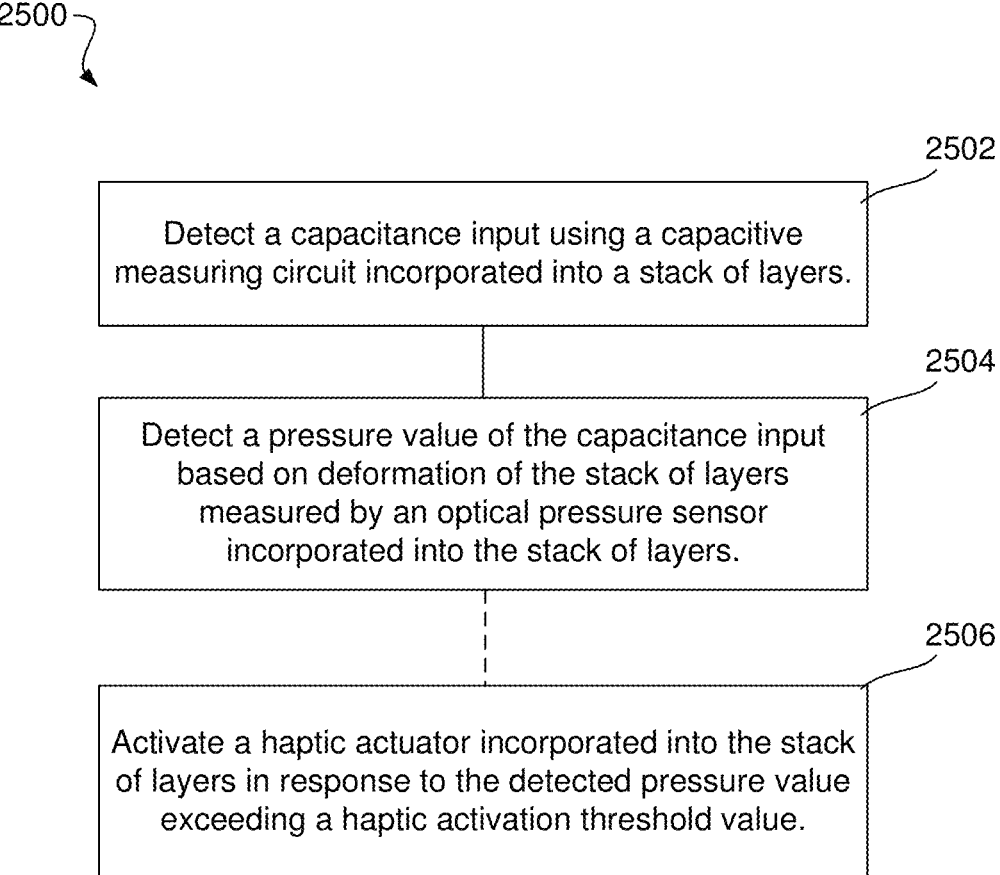

2502

Detect a capacitance input using a capacitive
measuring circuit incorporated into a stack of layers.

2504

Detect a pressure value of the capacitance input
based on deformation of the stack of layers
measured by an optical pressure sensor
incorporated into the stack of layers.

2506

Activate a haptic actuator incorporated into the stack
of layers in response to the detected pressure value
exceeding a haptic activation threshold value.

*Fig. 25*

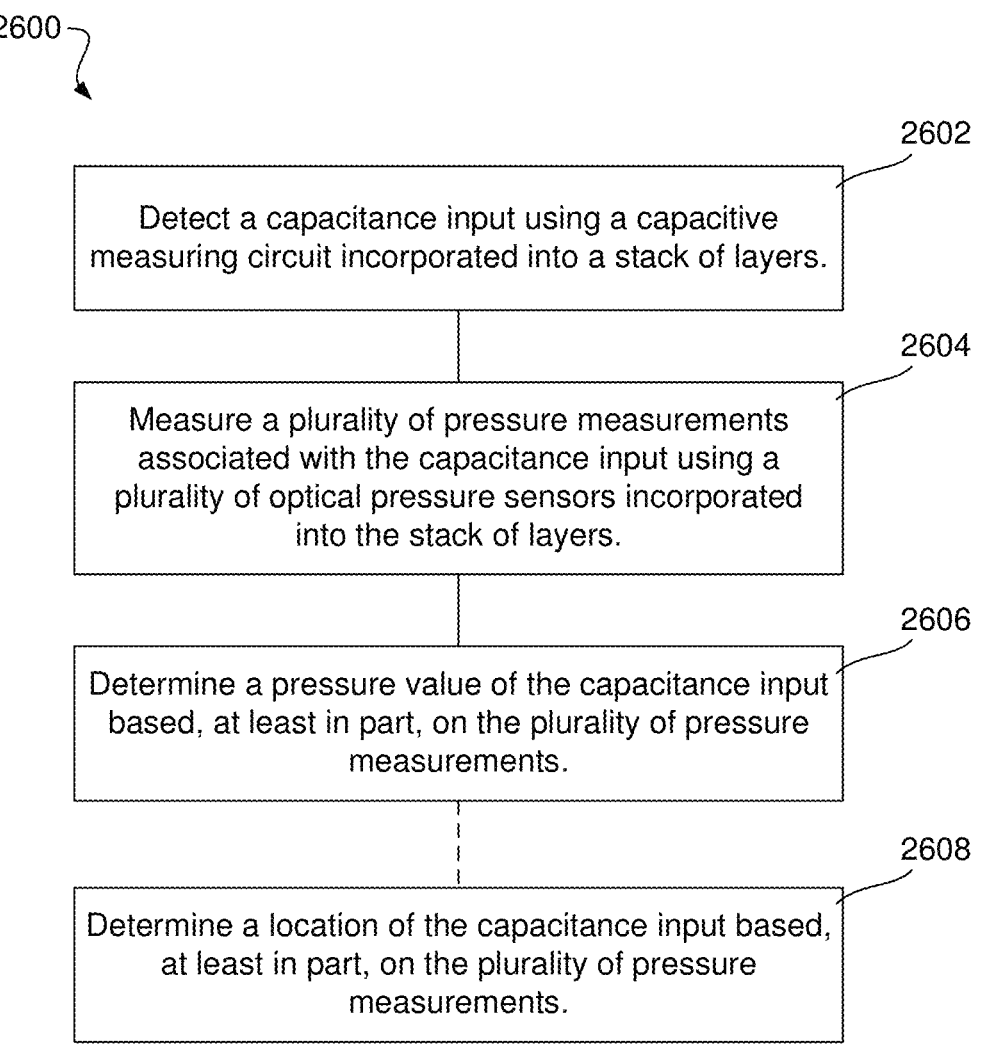

2600

2602

Detect a capacitance input using a capacitive measuring circuit incorporated into a stack of layers.

2604

Measure a plurality of pressure measurements associated with the capacitance input using a plurality of optical pressure sensors incorporated into the stack of layers.

2606

Determine a pressure value of the capacitance input based, at least in part, on the plurality of pressure measurements.

2608

Determine a location of the capacitance input based, at least in part, on the plurality of pressure measurements.

*Fig. 26*

OPTICAL PRESSURE SENSOR OF A CAPACITANCE MODULE

FIELD OF THE DISCLOSURE

This disclosure relates generally to systems and methods for touch-sensitive input devices. In particular, this disclosure relates to systems and methods for detecting pressure and location of user inputs on a capacitive input device with an optical sensor incorporated into the touch-sensitive input device.

BACKGROUND

Various technologies exist for detecting the force or pressure of user input on capacitive input devices such as trackpads. Capacitive force sensing measures changes in capacitance as surfaces deform under pressure, however, it can be susceptible to environmental factors like humidity and may struggle detecting the pressure of non-conductive objects. Strain gauge-based pressure sensing utilizes materials whose electrical resistance varies with deformation, allowing for force measurement, yet these sensors may also be affected by temperature fluctuations and may involve complex calibration. Each technique presents a trade-off between sensitivity, environmental robustness, and complexity, necessitating careful consideration based on the specific application requirements.

An example of pressure detection on a capacitive input device is disclosed in U.S. Pat. No. 10,353,506 issued to Michael Vosgueritchian, et al. This reference discloses structures and methods for an electronic device having an input surface that uses dual sensors to measure forces applied to the input surface. The forces can be estimated over a greater range of values than would be possible with either sensor alone. A second sensor can be used after a first sensor has reached a limit. A first sensor can be a strain sensor and a second sensor a pressure sensor. Both sensors may be resistance based, with signals from both sensors combined and measured by processing circuitry. Each sensor type may be part of planar arrays disposed beneath the input surface.

An example of a pressure-sensitive trackpad is disclosed in U.S. Pat. No. 9,250,754 issued to Matthew D. Tenuta, et al. This reference discloses a trackpad apparatus which includes a capacitive touch-sensing pattern disposed on a top surface of the trackpad apparatus and a capacitive pressure-sensing pattern disposed below the capacitive touch-sensing pattern. The trackpad apparatus also includes at least one controller. The controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus. In the example trackpad apparatus, the controller and the capacitive pressure-sensing pattern are collectively configured to detect location-specific changes in charge coupling in the capacitive pressure-sensing pattern resulting from pressure being applied to the top surface of the trackpad apparatus.

Each of these references are herein incorporated by reference for all that they disclose.

SUMMARY

In one embodiment, a capacitance module may include a stack of layers, a capacitance measuring circuit disposed on at least one of the layers of the stack of layers where the capacitance measuring circuit defines a capacitance input sensitive area associated with a face of at least one layer, the capacitance input sensitive area having a sensitive area length that is less than a face length of the face of the layer, the capacitance input sensitive area having a sensitive area width that is less than a face width of the face of the layer, an optical pressure sensor incorporated into the stack of layers aligned within the input sensitive area, and a controller in communication with the capacitance measuring circuit and the optical pressure sensor. The optical pressure sensor may be configured to detect deformation from a user input to the stack of layers within the capacitance input sensitive area.

The capacitance measuring circuit may be disposed on the first surface of the layer, and the optical pressure sensor may be disposed on the second surface of the layer.

The optical pressure sensor may include a transmission light emitting diode (LED) and a measurement LED.

The capacitance module may include an occlusion element incorporated into the stack of layers, where deformation of the stack of layers causes the occlusion element to progressively block light transmission between the transmission LED and the measurement LED in proportion to an amount of deformation.

The deformation may alter a direct light transmission path between the transmission LED and the measurement LED.

The deformation may alter an angular relationship between the transmission LED and the measurement LED.

The transmission LED may be configured to provide illumination for a visual indicator.

The optical pressure sensor may be part of a plurality of optical pressure sensors disposed within the capacitance input sensitive area.

The controller may be configured to receive at least one signal from the plurality of optical pressure sensors and determine a location of the user input based on pressure measurements from the plurality of optical pressure sensors.

The capacitance module may include a shield disposed between the capacitance measuring circuit and the optical pressure sensor.

The capacitance measuring circuit may be configured to detect a location of the user input and the optical pressure sensor may be configured to determine a pressure value of the user input.

The capacitance module may include a haptic actuator incorporated into the stack of layers, where the processor is configured to activate the haptic actuator in response to a pressure measurement from the optical pressure sensor.

In another embodiment, a method of using a capacitance module may include detecting a capacitance input using a capacitive measuring circuit incorporated into a stack of layers and detecting a pressure value of the capacitance input based on deformation of the stack of layers measured by an optical pressure sensor incorporated into the stack of layers.

The method may include activating a haptic actuator incorporated into the stack of layers in response to the detected pressure value exceeding a haptic activation threshold value.

In another embodiment, a method of using a capacitance module may include detecting a capacitance input using a capacitive measuring circuit incorporated into a stack of layers, measuring a plurality of pressure measurements associated with the capacitance input using a plurality of optical pressure sensors incorporated into the stack of layers, and determining a pressure value of the capacitance input based, at least in part, on the plurality of pressure measurements.

The method may include determining a location of the capacitance input based, at least in part, on the plurality of pressure measurements.

In another embodiment, a computer-program product for using a capacitance module may include a non-transitory computer-readable medium which stores instructions executable by a processor to determine a location of capacitance input based on an input from a capacitive measuring circuit incorporated in the capacitance module and determine a pressure value of the capacitance input based on an input from an optical pressure sensor incorporated into the capacitance module.

The stored instructions may include activating a haptic actuator incorporated into the capacitance module in response to the determined pressure value exceeding a haptic activation threshold value.

Determining the pressure value may include analyzing inputs from the optical pressure sensor and from at least one additional pressure sensor that is also incorporated into the capacitance module.

BRIEF DESCRIPTION OF THE DRAWINGS

FIG. 25 depicts an example of a method of using a capacitance module in accordance with the disclosure.

FIG. 26 depicts an example of a method of using a capacitance module in accordance with the disclosure.

Figure 1:
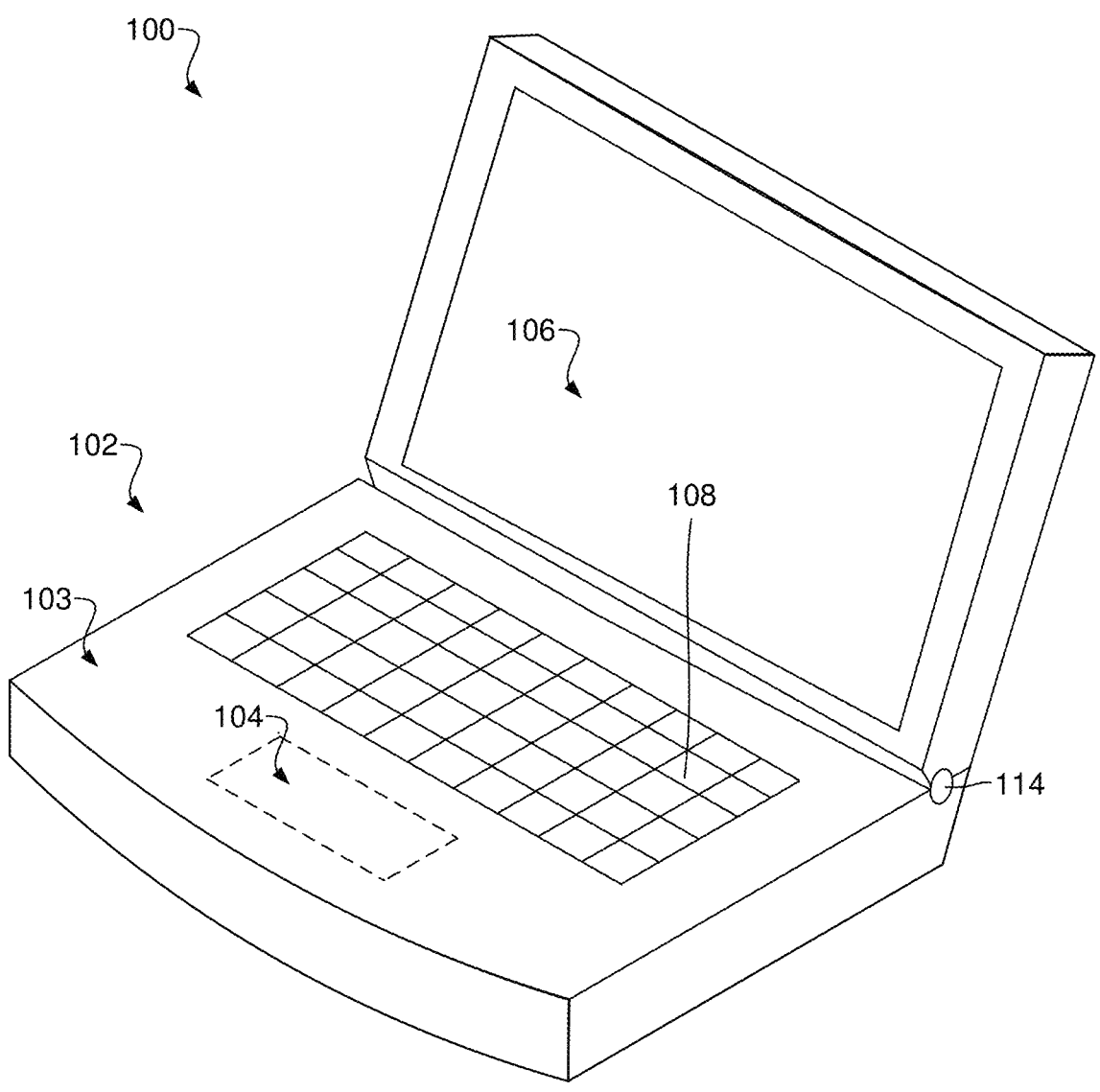
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "light emitting diode" (LED) may generally refer to a semiconductor device that emits light when current flows through it. An LED may include a p-n junction that emits light through electroluminescence when activated. LEDs may emit visible light, infrared light, ultraviolet light, or combinations thereof. LEDs may be included in various packages including surface-mount devices, through-hole packages, chip-on-board assemblies, or combinations thereof. LEDs may also incorporate additional optical elements such as lenses, diffusers, reflectors, or combinations thereof.

For the purposes of this disclosure, the term "LED reciprocity" may generally refer to the capability of an LED to both emit and detect light. When forward-biased, an LED may emit light. When reverse-biased, the same LED may function as a photodetector, generating current in response to incident light. This bidirectional functionality allows a single LED to serve as either a light source or a light sensor, depending on its electrical configuration and operating mode.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
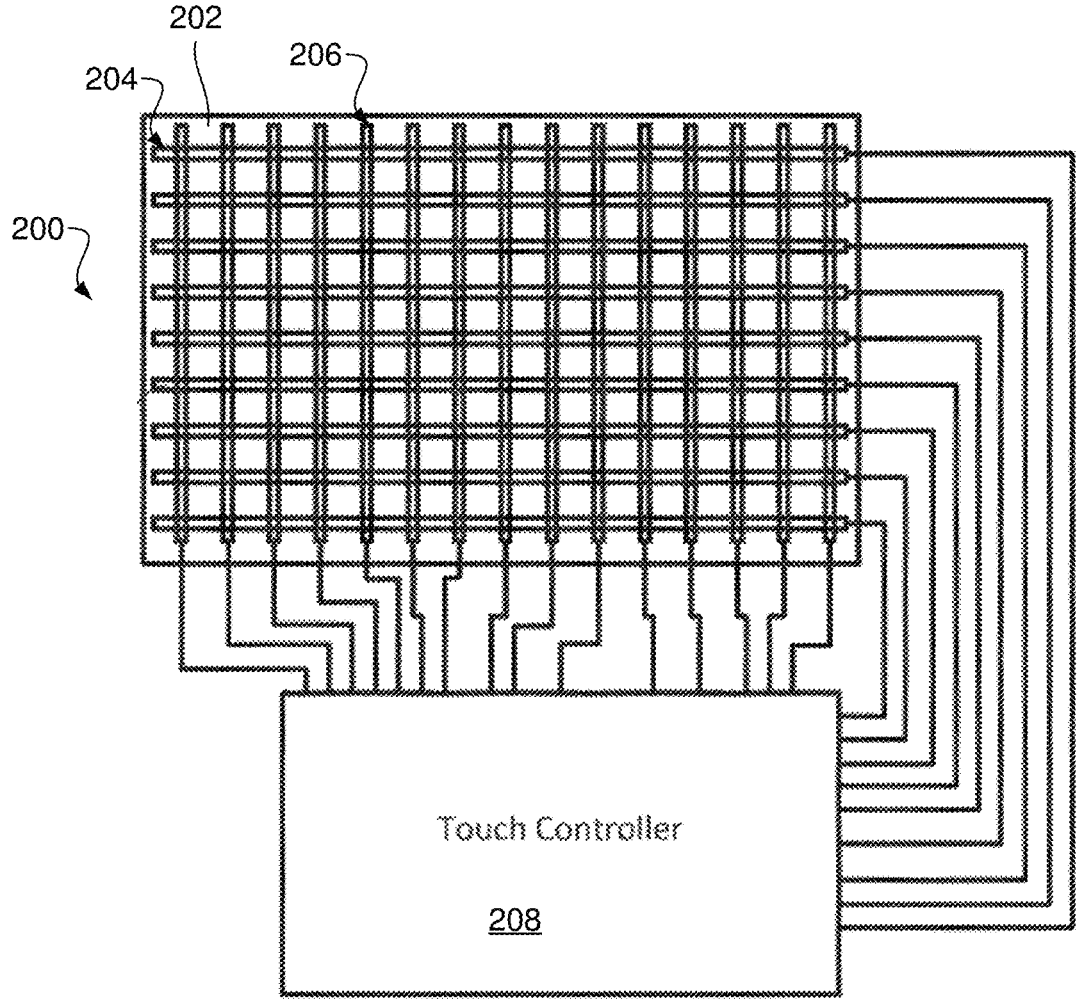
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
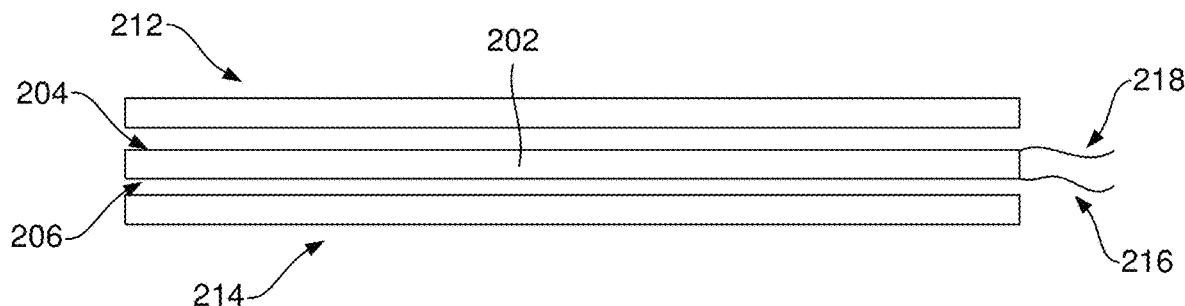
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
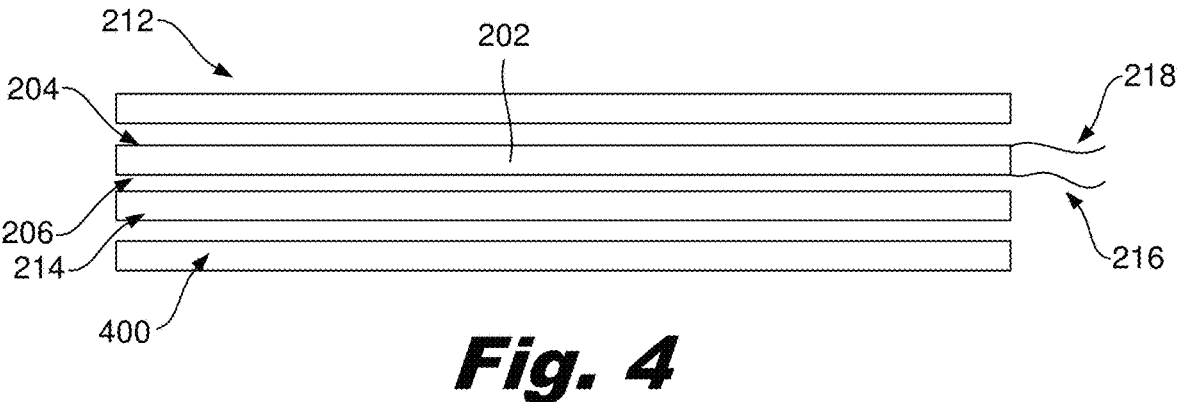
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5A:
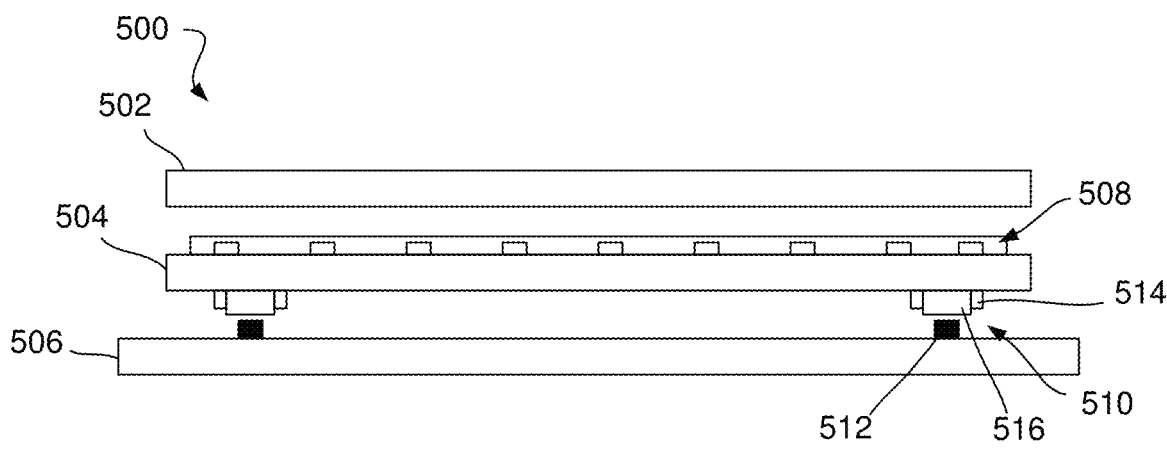
FIG. 5a depicts an example of a capacitance module in accordance with the disclosure.

FIG. 5a depicts an example of a capacitance module 500. In this example, the capacitance module 500 is a stack of layers, which includes a reference layer 502, a sensor layer 504, and a support layer 506. The sensor layer 504 includes a capacitance sensor 508 disposed on one surface of the sensor layer and optical pressure sensors 510 disposed on an opposite surface of the sensor layer 504. The optical pressure sensors 510 include LEDs 514 and light pipes 516. The support layer 506 includes occlusion elements 512 disposed on one surface of the support layer.

In this example, the sensor layer 504 may be an intermediate layer located between the reference layer 502 and the support layer 506. In other examples, a sensor layer may have a different position relative to other layers within the stack.

The sensor layer 504 may be a substrate with a first surface and a second surface opposite the first surface. In this example, the capacitance sensor 508 is disposed on the first surface and the optical pressure sensors 510 are disposed on the second surface. In other examples, a capacitance module may be disposed on a second surface and optical pressure sensors disposed on a first surface. In other examples, an optical pressure sensor may be disposed on the same surface as a capacitance sensor. In yet other examples, an optical pressure sensor may be disposed on the same surface as a capacitance sensor within the touch sensitive region of the capacitance sensor.

The capacitance sensor 508 may be implemented as a mutual capacitance sensor, including a first and second set of electrodes. In other examples, the capacitance sensor 508 may be a self-capacitance sensor, including a single set of electrodes or even a single electrode.

The optical pressure sensors 510 may detect the pressure of a user input on the capacitance module 500 by measuring changes in light transmission caused by the deformation of the capacitance module. Each optical pressure sensor 510 may include at least one light source and at least one light-detecting element configured to receive light transmitted by the light source. In this example, the light pipe 516 may be positioned between the light source and light-detecting element to provide a defined optical path for light transmission. When a user input generates pressure, the capacitance module 500 may deform and alter the optical path between the light source and light-detecting element of an optical pressure sensor. The alteration in the optical path may cause measurable changes in the light received by the light-detecting element, which can be correlated to an amount of pressure applied by the user input.

In this example, the optical pressure sensors 510 may incorporate LEDs 514 as light sources and light-detecting elements. A transmission LED may be activated, creating light which is measured by a measurement LED of the optical pressure sensor 510. In other examples, an optical pressure sensor may incorporate an LED as a light source and a photodiode as a light-detecting element. Incorporating a photodiode as a light detector may increase the accuracy of the light-detecting element at measuring optical signals.

The LEDs 514 may be constructed to emit light at a wavelength corresponding to red light, in some examples, in the range of 620-750 nanometers. This wavelength selection may provide advantageous power consumption characteristics while maintaining measurement accuracy. In other examples, an optical pressure sensor may operate using a different wavelength of light.

The optical pressure sensors 510 may measure various characteristics of the light to determine a pressure value of a user input. In some examples, the root mean squared (RMS) power of the light received by the light detector may be measured and compared to a baseline value to determine the pressure. In other examples, the peak intensity of the received light may be analyzed to determine a pressure value. In other examples, a pressure value may be determined based on a received light's RMS value, peak intensity, spectral distribution, temporal variation, another characteristic, or combinations thereof.

The pressure value may be determined through a calibrated relationship between the measured light characteristics and applied pressure. Multiple characteristics may be combined to increase the accuracy and reliability of the pressure measurements made by the optical pressure sensors 512.

The light pipe 516 may be constructed from various optically transparent materials such as acrylic (PMMA), polycarbonate, optical grade silicone, a specialty optical polymer, another optically transparent material, or combinations thereof. The material selected for the light pipe 516 may be selected for its ability to maintain total internal reflection under normal operating conditions or for another characteristic.

During operation, light from the light source of the optical pressure sensor 510 may enter the light pipe 516 and propagate through it by internal reflection. In some cases, the reflection may be a total internal reflection that may occur when light strikes the interface between the light pipe material and the surrounding medium at an angle greater than a critical angle.

The material selection for the light pipe 516 may be optimized based on several factors, including the wavelength of light used by the light source and the desired mechanical properties. For example, if a transmission LED of an optical pressure sensor emits light at a certain wavelength, a material with low absorption at that wavelength and an appropriate refractive index may be selected to maximize transmission efficiency. The mechanical properties of the light pipe material, such as its elastic modulus and yield strength, may also be considered depending on the desired deformation response and sensor durability.

When the light pipe 516 deforms, some light rays may strike the interface at angles less than the critical angle, causing them to escape rather than undergo total internal reflection. This effect may result in a measurable decrease in the light received by the light detector of the optical pressure sensor 510, which may correlate to an amount of deformation. Optical pressure sensors which include light pipes according to this implementation may offer several advantages over other waveguide constructions, including simplified assembly, consistent optical properties, and predictable mechanical behavior.

While the optical pressure sensor 510 in this example uses a light pipe 516, in other examples, another type of waveguide may be used. For example, an optical pressure sensor may uses an optical fiber, a planar waveguide, a structured optical film, or another type of waveguide. In yet other examples, the optical transmission path between a light source and light-detecting element of an optical pressure sensor may be a free space transmission path, eliminating the need for a physical waveguide structure while maintaining pressure measurement capabilities through direct optical path manipulation.

The occlusion elements 512 may be disposed on one surface of the support layer 506 and constructed to interact with corresponding optical pressure sensors 510 on the sensor layer 504. Each occlusion element 512 may be positioned to align with a light pipe 516 of an optical pressure sensor 510, such that when pressure is applied to the capacitance module 500, the occlusion element engages with and deforms the light pipe in a controlled manner.

The occlusion elements 512 may be formed from a substantially rigid material to maintain consistent interaction characteristics with the light pipes 516. In some examples, an occlusion element 512 may have a rounded or curved surface to provide gradual deformation of the light pipe 516, while in other examples, the occlusion element may have a different geometry to achieve specific deformation patterns. The size and shape of each occlusion element 512 may be optimized to achieve desired pressure sensitivity and measurement range for the corresponding optical pressure sensor 510.

In this example, the optical pressure sensors 510 include light pipes 516 which define the optical path for light transmission. In examples where optical pressure sensors operate with free space optical paths (e.g., no waveguide defined transmission paths), an occlusion element may be constructed to partially or fully block the optical path between the light source and light-detecting element. In some examples, the occlusion elements 512 may also be shaped or positioned to cause angular deflection of the light path when the capacitance module 500 is deformed. In yet other examples, an occlusion element may include optical features such as diffraction gratings or prismatic surfaces which modify the light characteristics in a pressure-dependent manner.

Figure 5B:
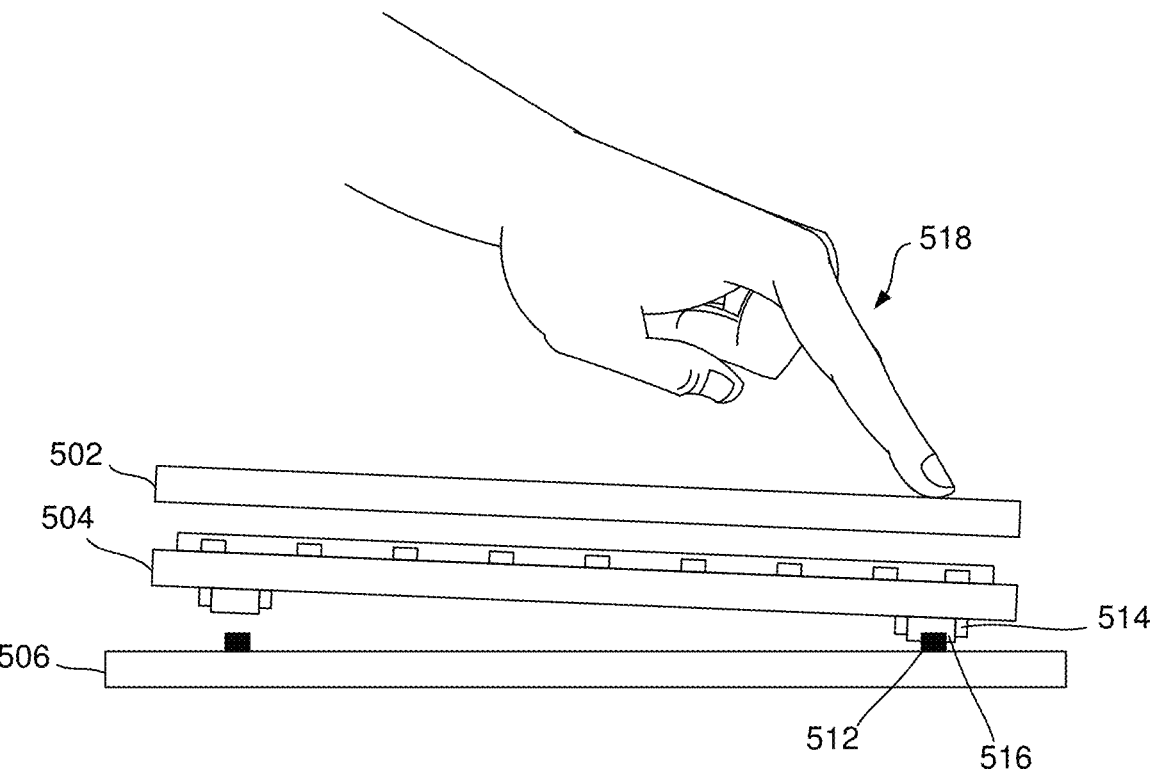
FIG. 5b depicts an example of a user input in accordance with the disclosure.

FIG. 5b depicts an example of a user input 518 on the capacitance module 500. In this example, the user input 518 depresses the reference surface 502 causing the occlusion element 512 of the support layer 506 to deform the light pipe 516 of the optical pressure sensor. The deformation of the light pipe 516 may cause a change in the measured light detected by the measurement LED of the optical pressure sensor, and this change may be correlated to a pressure value of the user input 518.

Figure 6A:
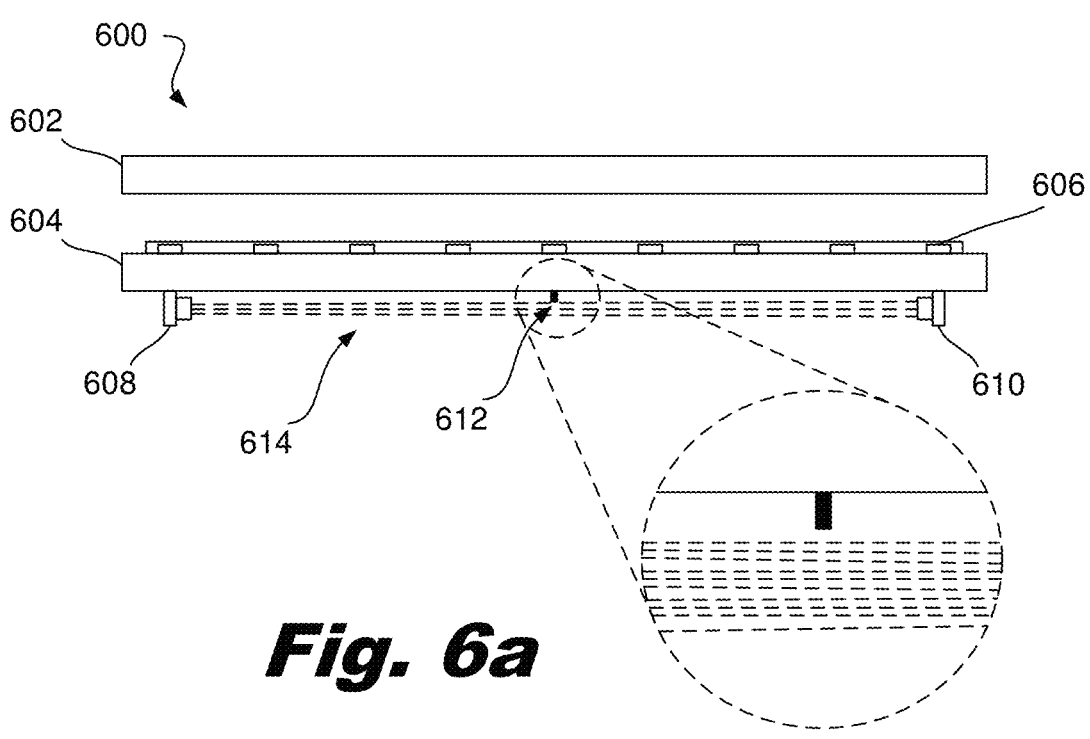
FIG. 6a depicts an example of a capacitance module in accordance with the disclosure.

FIG. 6a depicts an example of a capacitance module 600. In this example, the capacitance module 600 is a stack of layers, which includes a reference layer 602 and a sensor layer 604 located adjacent to the reference layer 602 within the stack. The sensor layer 604 includes a capacitance sensor 606 on one surface of the layer and an optical pressure sensor on an opposite surface of the layer. The optical pressure sensor includes a transmission LED 608, a measurement LED 610, and an occlusion element 612. A light transmission path 614 extends from the transmission LED 608 to the measurement LED 610.

The capacitance module 600 may detect user input using the capacitance sensor 606 on the sensor layer 604. The capacitance sensor 606 may detect changes in capacitance between electrodes when a conductive object, such as a user's finger, approaches or contacts the reference layer 602. The capacitance sensor 606 may include an array of electrodes operating in mutual capacitance, allowing the capacitance sensor to determine both the presence and location of user input relative to the reference layer 602.

In this example, the optical pressure sensor operates by establishing a free space light transmission path 614 between the transmission LED 608 and the measurement LED 610. The transmission LED 608 emits light along the transmission path 614, which is received by the measurement LED 610 during normal operation of the capacitance module 600. The occlusion element 612 may be positioned along the light transmission path 614 between the transmission LED 608 and the measurement LED 610. When the capacitance module 600 experiences deformation from a user input, the occlusion element 612 may progressively interrupt the light transmission path, changing the amount of light measured by the measurement LED 612.

The pressure value may be determined through a calibrated relationship between the measured light characteristics and applied pressure. For example, the degree of light attenuation caused by the occlusion element 612 may follow a predictable curve as greater pressure is applied, allowing for precise measurements based on the amount of light reaching the measurement LED 610.

Figure 6B:
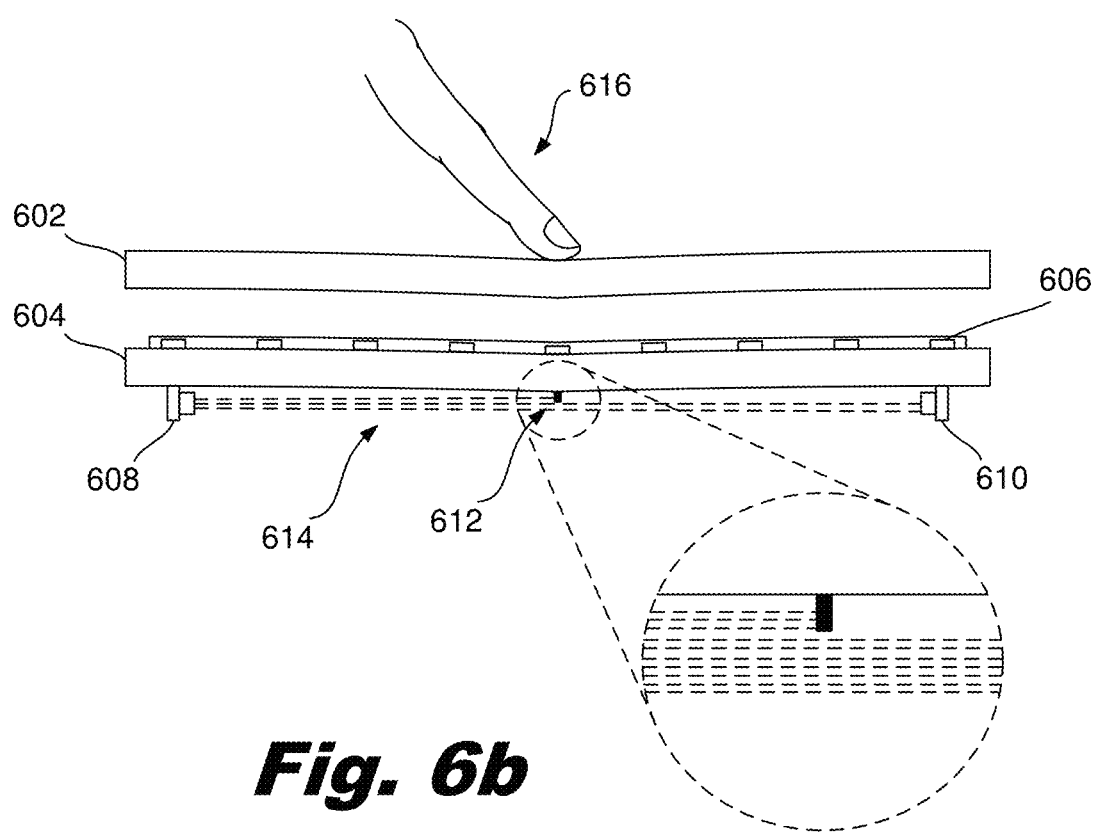
FIG. 6b depicts an example of a user input in accordance with the disclosure.

FIG. 6b depicts an example of a user input 616 applied to the capacitance module 600. In this example, the user input 616 applies pressure to the reference layer 602, which causes deformation of the capacitance module 600. The applied pressure creates a localized depression in the reference layer 602, which propagates through the stack of layers including the sensor layer 604.

The deformation of the capacitance module 600 as a result of the user input 616 may cause the occlusion element 612 to move relative to the light transmission path 614 between the transmission LED 608 and the measurement LED 610. As the deformation increases with greater applied pressure, the occlusion element 612 may progressively interrupt more of the light transmission path 614. This progressive interruption may result in a corresponding decrease in the light received by the measurement LED 610, allowing the optical pressure sensor to determine the amount of pressure applied by the user input 616.

The user input 616 may be simultaneously detected by both the capacitance sensor 616 and the optical pressure sensor. The capacitance sensor 606 may detect the location of the user input 616 through changes in capacitance, while the optical pressure sensor concurrently measures the pressure of the same user input 616 through changes in light transmission. This dual-sensing capability enables the capacitance module 600 to provide both position and pressure information for the user input 616.

Figure 7:
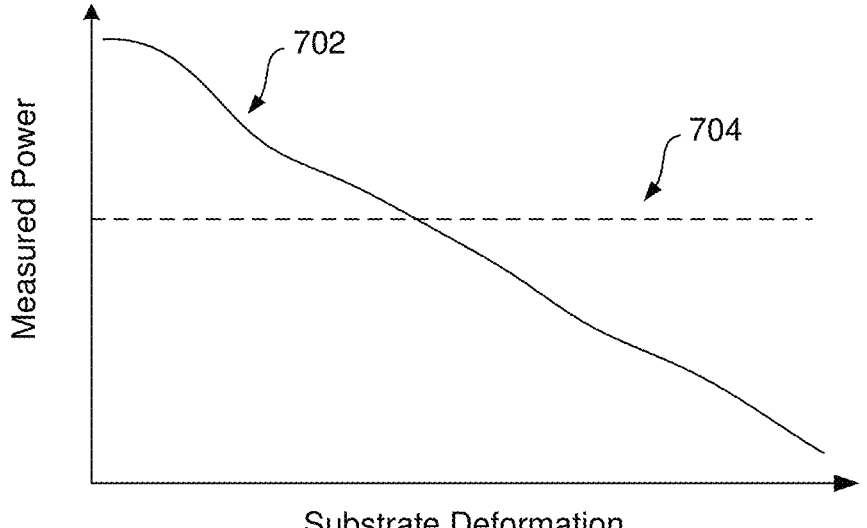
FIG. 7 depicts an example of a transmission power curve in accordance with the disclosure.

FIG. 7 depicts an example of a measured power curve 702. In this example, the transmission power curve 702 is a relationship of power measured by a measurement LED of an optical pressure sensor and substrate deformation of a capacitance module. Measured power is represented on the y axis, and substrate deformation is represented on the x axis.

For low deformation values, where the deformation of the capacitance module is low or zero, the power measured by the measurement LED is at or near its maximum value. As the pressure and corresponding substrate deformation increases, the measured power may decrease along the measured power curve 702.

A power threshold 704 represents a specific power level that may be used to classify a user input as a pressure input. When the measured power falls below the power threshold 704, the user input may be classified as a firm press.

Conversely, when the measured power remains above the power threshold 704, the user input may be classified as a light press or no press.

While this example depicts a single power threshold 704 for binary pressure classification, in other examples, an optical pressure sensor may implement various pressure determination schemes. In some examples, the measured power may be mapped to a continuous range of substrate deformation values, providing precise pressure measurements across the full range of possible deformation. In other examples, multiple power thresholds may be used to quantize pressure into discrete levels, such as a light press, medium press, firm press, etc. The pressure determination scheme may be selected based on the requirements of the specific application. Additionally, the pressure determination scheme may be dynamically adjusted based on user preferences, application context, or environmental conditions.

The relationship between substrate deformation and measured power, as shown by the measured power curve 702, may be calibrated during manufacturing or periodically during operation to ensure accurate pressure determination. The calibration may account for variations in component characteristics, environmental conditions, and aging of materials to maintain consistent pressure sensing performance over time.

Figure 8A:
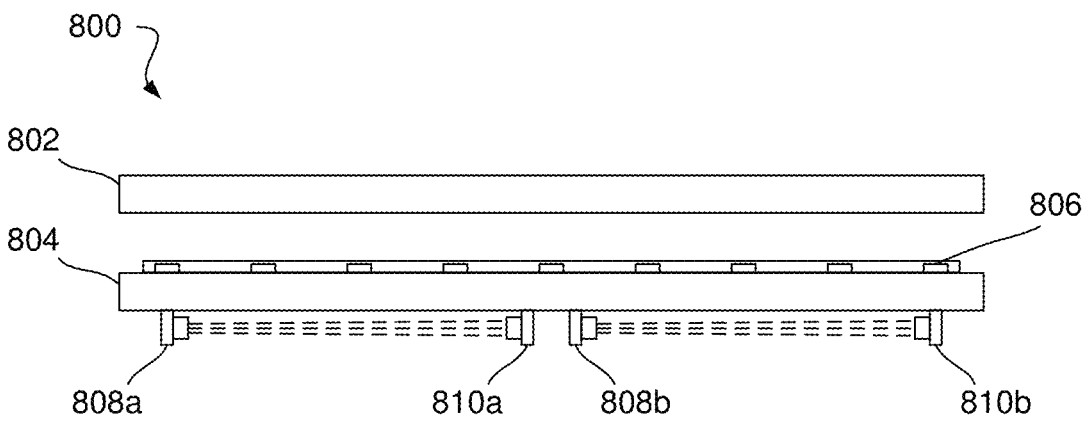
FIG. 8a depicts an example of a capacitance module in accordance with the disclosure.

FIG. 8a depicts a capacitance module 800 featuring multiple optical pressure sensors. The capacitance module 800 includes a reference layer 802, a sensor layer 804 with a capacitance sensor 806, and two optical pressure sensor pairs. Each pair includes a transmission LED 808a, 808b and a corresponding measurement LEDs 810a, 810b. The optical pressure sensors in this example rely on changes in the angular relationships between the paired LEDs to measure applied pressure.

The angular relationship between each transmission LED and measurement LED pair provides a unique mechanism for pressure detection. As the capacitance module 800 deforms, the relative angle between paired LEDs changes, altering the intensity and distribution of received light. This change may be measured and correlated to applied pressure without requiring additional mechanical elements such as occlusion elements or waveguides, potentially simplifying manufacturing and improving reliability.

The capacitance module 800 depicted in this example includes multiple optical pressure sensors, which may provide several advantages. Multiple pressure measurements may allow for more accurate pressure determination through data averaging techniques. A spatial distribution of multiple pressure measurements may be used to determine a location of a user input, either complementing the capacitance sensor 806 for enhanced accuracy or serving as a redundant localization system. In some implementations, the optical pressure sensors may even function as the primary input location detection system, particularly in environments where capacitive sensing may be compromised by electrical interference or when using non-conductive input objects.

Figure 8B:
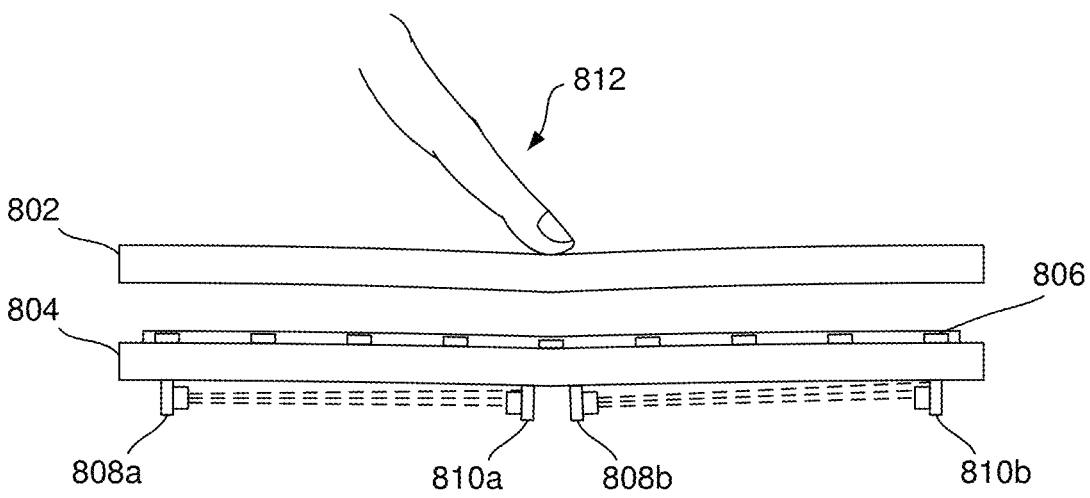
FIG. 8b depicts an example of a user input in accordance with the disclosure.

FIG. 8b depicts a user input 812 on the capacitance module 800. As the user input 812 deforms the capacitance module 800, the angular relationships between the multiple LED pairs may change, affecting the received power by the measurements LEDs 810a, 810b. The responses from each optical pressure sensor may enable both pressure measurement and input localization through analysis of the relative changes in light transmission across the sensor pairs.

Figure 9:
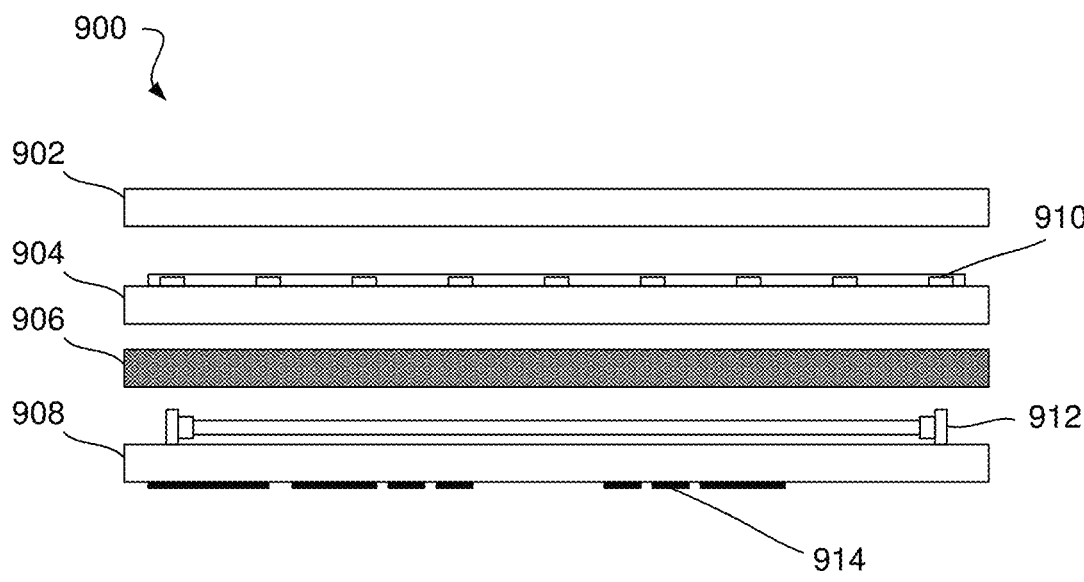
FIG. 9 depicts an example of a capacitance module in accordance with the disclosure.

FIG. 9 depicts a capacitance module 900 with a reference layer 902, a sensor layer 904 with a capacitance sensor 910, a shield layer 906, and a component layer 908. The component layer 908 includes an optical pressure sensor 912 disposed on its upper surface, with additional electronic components 914 disposed on its lower surface. This relative orientation of layers within the capacitance module 900 demonstrates how various functional elements may be efficiently integrated within the stack while maintaining proper isolation and operation.

Figure 10:
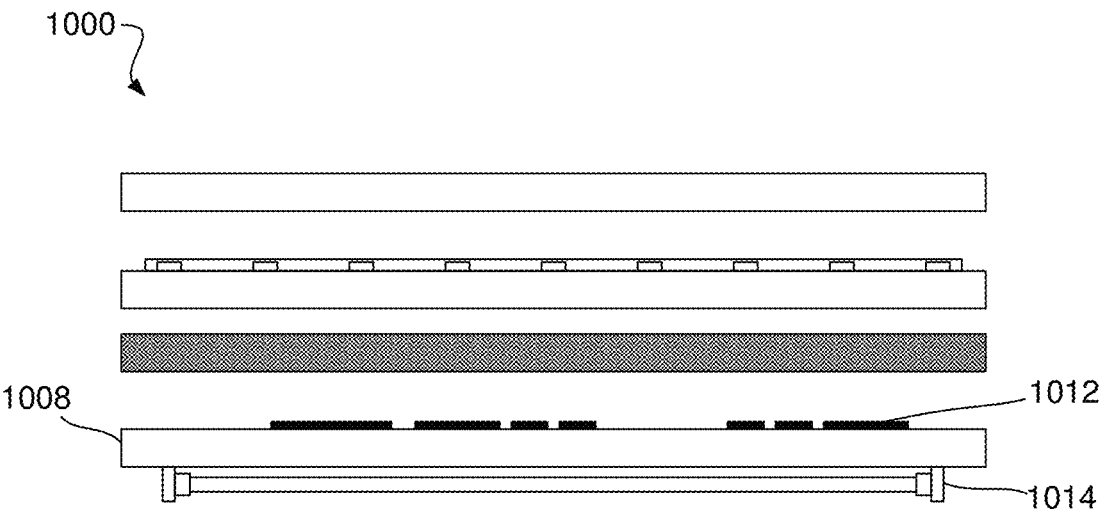
FIG. 10 depicts an example of a capacitance module in accordance with the disclosure.

FIG. 10 depicts a capacitance module 1000 with a component layer 1008. In this example, the component layer 1008 includes an optical pressure sensor 1012 on the lower surface of the layer, while components are disposed on the upper surface of the layer. The placement of the optical pressure sensor 1012 on the lower surface of the component layer 1008 may offer certain advantages in specific applications, such as simplified assembly improved thermal management or enhanced protection from environmental factors. This example demonstrates how a capacitance module may maintain the fundamental functionality of both capacitive sensing and optical pressure detection, regardless of relative orientation of layers and elements.

Figure 11:
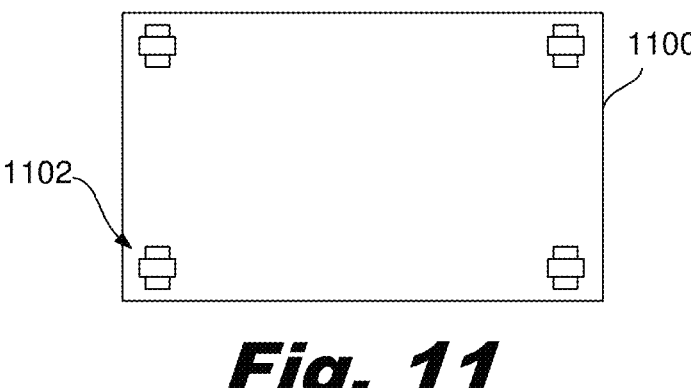
FIG. 11 depicts an example of optical pressure sensors in accordance with the disclosure.

FIG. 11 depicts an example of a sensor layer 1100 which incorporates four optical pressure sensors 1102 positioned in the corners of the layer. These sensors may each include a transmit LED and a measurement LED pair. This arrangement may be able pressure measurements at the peripheral regions of the capacitance module. With these optical pressure sensors 1102 positioned in the peripheral regions of the capacitance module, the optical pressure sensors 1102 may be able measure pressure values of inputs in both the central portions of the capacitance module as well as the peripheral regions of the capacitance module. A pressure input made in a central region of the capacitance module may be measured by one or more of the optical pressure sensors 1102 in the peripheral regions of the capacitance module. The pressure measurements obtained with at least one of the optical pressure sensors in the peripheral regions may be used to triangulate where the pressure input is located on the capacitance module's touch sensitive regions.

Figure 12:
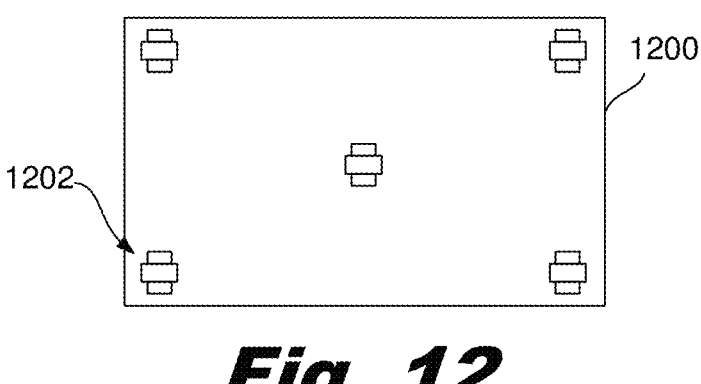
FIG. 12 depicts an example of optical pressure sensors in accordance with the disclosure.

FIG. 12 depicts an example of a sensor layer 1200 which incorporates five optical pressure sensors 1202 positioned in the corners and center of the layer. The inclusion of a fifth optical pressure sensor 1202 in the center of the sensor layer 1200 may provide more regions of pressure sensitivity compared to the sensor layer 1100 depicted in FIG. 11.

Figure 13:
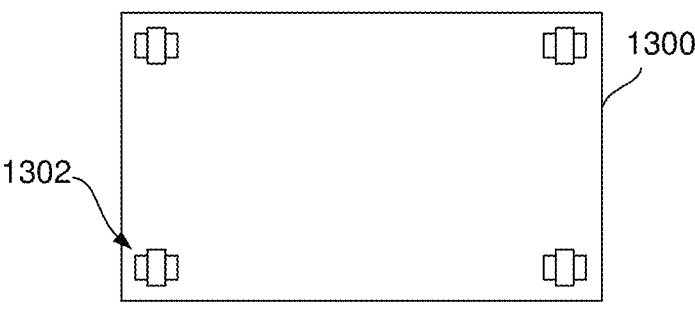
FIG. 13 depicts an example of optical pressure sensors in accordance with the disclosure.

FIG. 13 depicts an example of a sensor layer 1300 which incorporates four optical pressure sensors 1302 positioned in the corners of the layer. In this example, the orientations of the optical pressure sensors 1302 are different from those depicted in FIG. 11. This example demonstrates the flexibility of sensor orientation of optical pressure sensors on a sensor layer.

Figure 14:
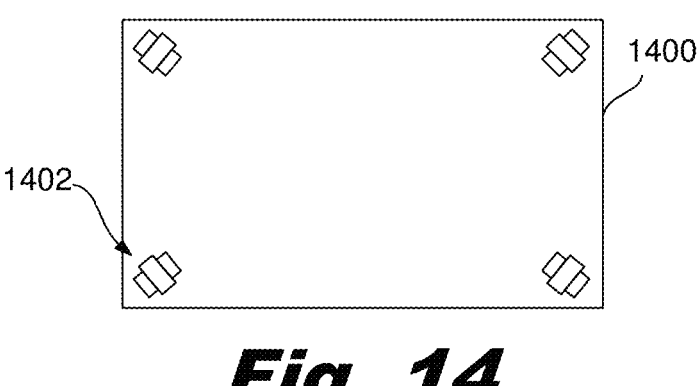
FIG. 14 depicts an example of optical pressure sensors in accordance with the disclosure.

FIG. 14 depicts an example of a sensor layer 1400 which incorporates four optical pressure sensors 1402 that are oriented in an angular orientation with respect to the length and width of the touch sensitive area.

Figure 15:
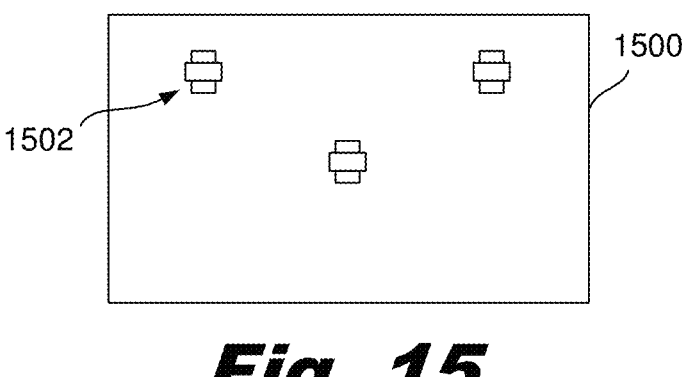
FIG. 15 depicts an example of optical pressure sensors in accordance with the disclosure.

FIG. 15 depicts an example of a sensor layer 1500 with three optical pressure sensors 1502. The number of optical pressure sensors and location of the sensors on the sensor layer may be determined based on typical usage characteristics.

Figure 16:
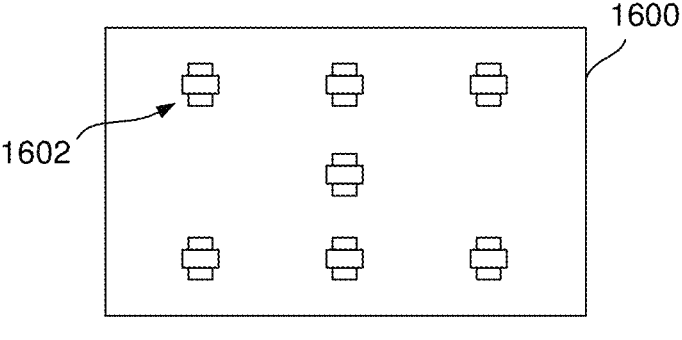
FIG. 16 depicts an example of optical pressure sensors in accordance with the disclosure.

FIG. 16 depicts an example of a sensor layer 1600 which incorporates seven optical pressure sensors 1602 in yet another possible orientation.

Figure 17:
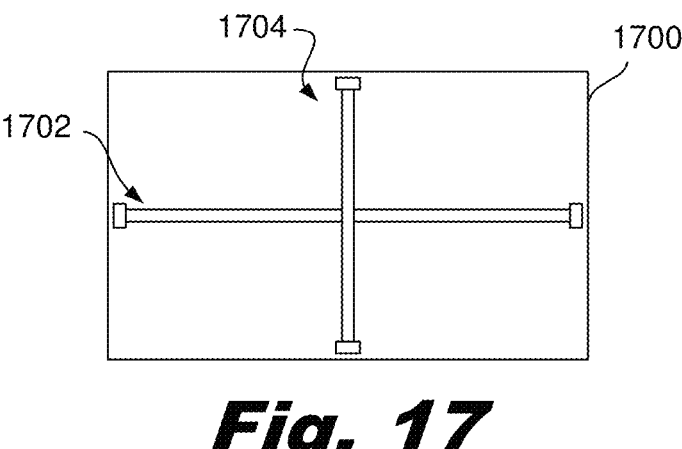
FIG. 17 depicts an example of optical pressure sensors in accordance with the disclosure.

FIG. 17 depicts an example of a sensor layer 1700 which incorporates a first optical pressure sensor 1702 and a second optical pressure sensor 1704. The first optical pressure sensor 1702 and second optical pressure sensor 1704 cross each other. This configuration of optical pressure sensors may enable pressure detection along two primary axes while minimizing the number of components.

In this example, the first optical pressure sensor 1702 and the second optical pressure sensor 1704 cross each other. The crossing configuration of the optical pressure sensors may be enabled through various constructions of the light pipe system. In some examples, the first optical pressure sensor 1702 and second optical pressure sensor 1704 may be positioned at different vertical lengths within the sensor layer, allowing their light pipes to physically cross without optical interference. In other examples, the light pipes may be constructed from materials with different refractive indices, creating optical isolation between the crossing paths. The first optical pressure sensor 1702 may use a light pipe with a higher refractive index that effectively contains its light transmission, while the second optical pressure sensor 1704 may employ a light pipe with a different refractive index optimized for its specific transmission characteristics. In other examples, optical isolation between crossing light pipes may be achieved through wavelength separation, where the first optical pressure sensor 1702 emits light at a first wavelength and the second optical pressure sensor 1704 emits light at a different wavelength than the first. This wavelength-based separation may enable reliable pressure detection even at the intersection point between the light pipes.

While the optical pressure sensors 1702, 1704 in this example incorporate light pipes between their transmission and measurement LEDs, in other examples, such as free body optical pressure sensor implementations where the light transmission paths cross each other, other techniques may be employed to prevent optical interference between the optical pressure sensors. In some examples, the transmission LEDs of the optical pressure sensors may emit light at different wavelengths, with corresponding measurement LEDs incorporating optical filters to detect only their intended wavelength. In other examples, the light from each optical pressure sensor may be polarized in different orientations, with measurement LEDs incorporating polarization filters to selectively detect light from the corresponding transmission LED. These techniques may be used individually or in combination with other techniques to ensure accurate pressure detection from both optical pressure sensors.

Figure 18:
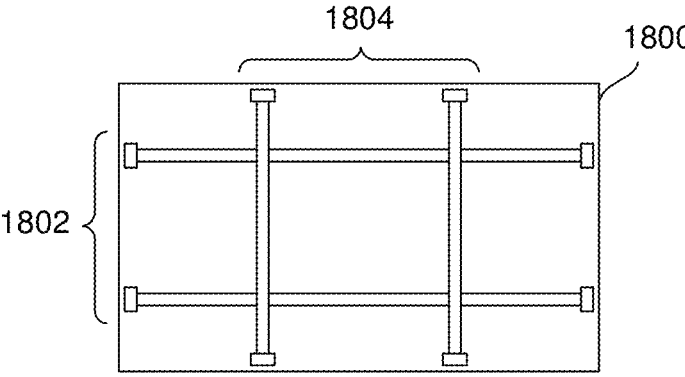
FIG. 18 depicts an example of optical pressure sensors in accordance with the disclosure.

FIG. 18 depicts an example of a sensor layer 1800 which incorporates a first set 1802 of optical pressure sensors and a second set 1804 of optical pressure sensors. The first set 1802 and second set 1804 of optical pressure sensors cross each other, forming a more complex grid pattern than the pattern shown in FIG. 17. This configuration may provide increased measurement points while maintaining the advantages of the crossed light pipe architecture.

Figure 19:
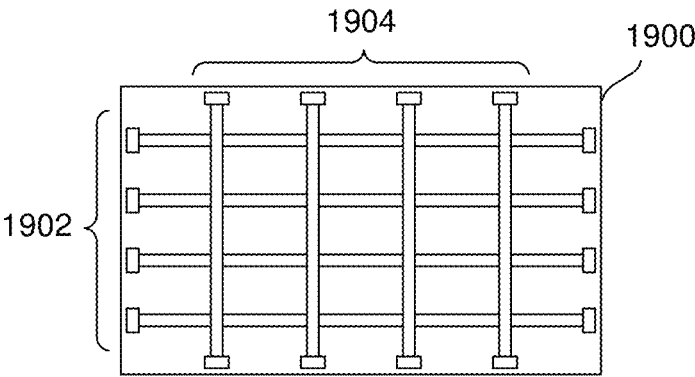
FIG. 19 depicts an example of optical pressure sensors in accordance with the disclosure.

FIG. 19 depicts an example of a sensor layer 1900 which incorporates a first set 1902 of optical pressure sensors and a second set 1904 of optical pressure sensors. The sets 1902, 1904 of optical pressure sensors may provide a high density of measurement points. This configuration may provide even precision and localization of user input and more accurate pressure measurements.

Figure 20A:
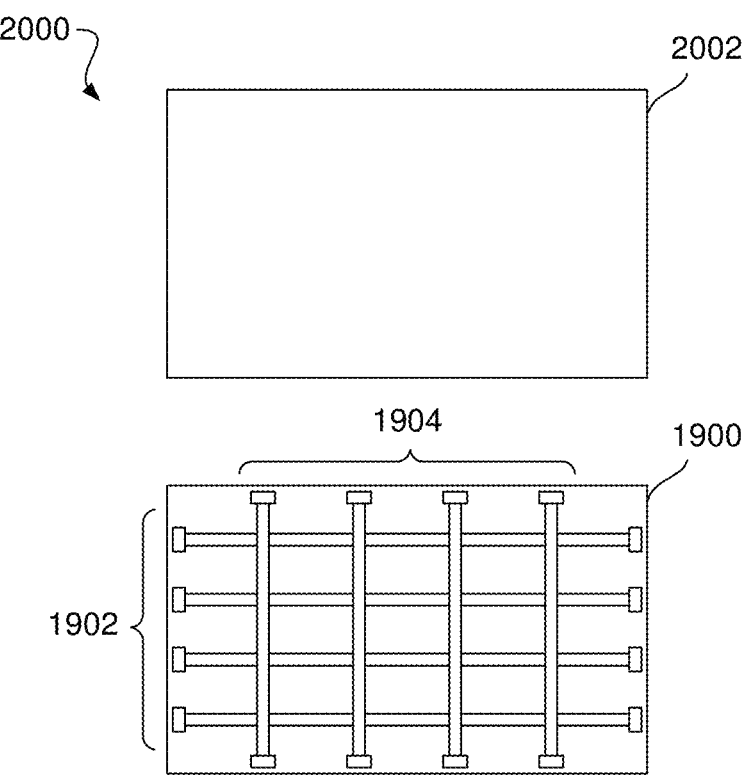
FIG. 20a depicts an example of a capacitance module in accordance with the disclosure.

FIG. 20a depicts a capacitance module 2000 which incorporates the sensor layer 2000 described in FIG. 20, positioned beneath a reference surface 2002. The grid arrangement of crossed optical pressure sensors, including sets 1902 and 1904, creates a high-density matrix of measurement points across the sensing area. This configuration may effectively divide the reference surface 2002 into discrete detection zones defined by the intersections of the light pipes of the optical pressure sensors.

Figure 20B:
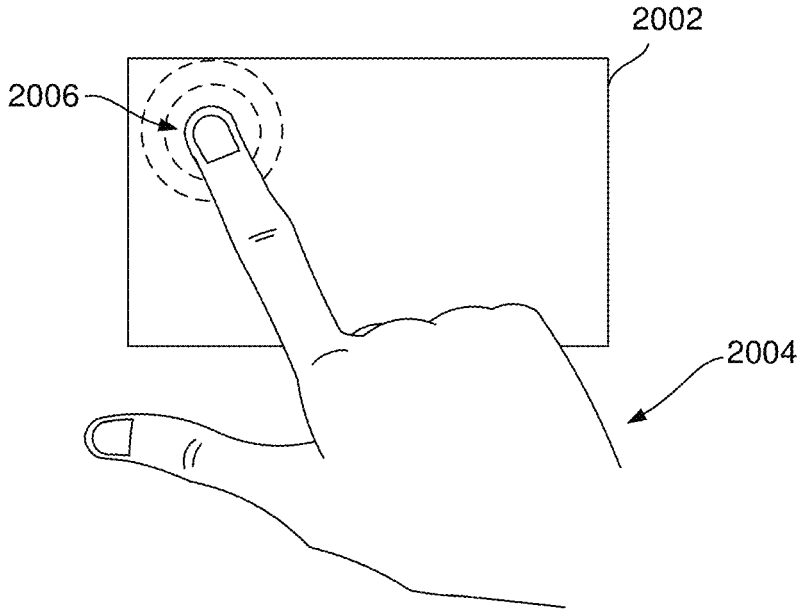
FIG. 20b depicts an example of a user input in accordance with the disclosure.

FIG. 20b depicts an example of a user 2004 interacting with the capacitance module. In this example, the user 2004 applies a user input 2006 to the reference surface 2002. As the user input 2006 causes localized deformation on the reference surface 2002, multiple light pipes in the vicinity of the input may also experience deformation, causing changes in the light transmission of the associated optical pressure sensors. By analyzing the changes in pressure measured by the optical pressure sensors, the location of the user input 2006 may be determined through triangulation and interpolation techniques. Each crossing point in the grid of optical pressure sensors may act as a distinct measurement node, with the relative magnitude of transmission changes at adjacent nodes enabling precise localization of the input 2006.

The accuracy and precision of user input location detection using optical pressure sensors in a capacitance module may be affected by the number of optical pressure sensors incorporated into the capacitance module. Including a greater number of optical pressure sensors may increase the accuracy and precision of user input location detection. The high density of measurement points provided by configurations with more optical pressure sensors may enable redundant measurements that can improve accuracy. The regular spacing of measurement points may allow for interpolation between the nodes.

Figure 21:
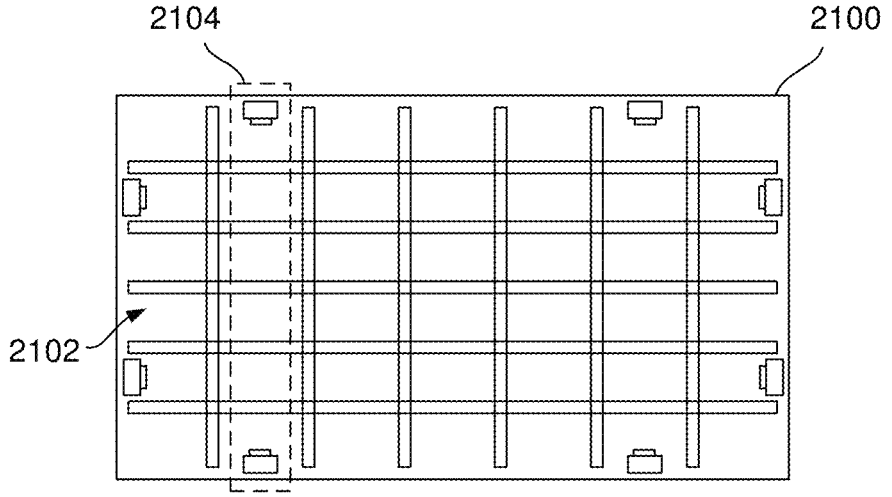
FIG. 21 depicts an example of a sensor layer in accordance with the disclosure.

FIG. 21 depicts a sensor layer 2100. The sensor layer 2100 includes a capacitance sensor 2102 and optical pressure sensors 2104 disposed on the same surface of the sensor layer. The electrodes of the capacitance sensor 2102 may be arranged in a grid pattern on the surface of the sensor layer 2100 with the LEDs of the optical pressure sensors 2104 strategically positioned within spaces between the electrodes. This arrangement of capacitance sensor and optical pressure sensors on the same surface of a layer demonstrates an efficient use of surface area while maintaining the functionality of both sensors.

The placement of optical pressure sensors 2104 between the electrodes of the capacitance sensor 2102 may offer several advantages. This configuration may reduce the overall thickness of a capacitance module by eliminating the need for separate surface or layers for each sensor type. Additionally, the placement of LEDs between the electrodes may ensure that the optical pressure sensors 2104 do not interfere with the electrode pattern of the capacitance sensor 2102 maintaining optimal capacitive sensing performance. This arrangement may also simplify the manufacturing process of a capacitance module by allowing both sensors to be disposed onto the sensor layer 2100 in a single assembly step.

In examples where optical pressure sensors are disposed on the same surface as a capacitance sensor, the optical pressure sensors may be specifically sized and positioned to fit within the geometric constraints imposed by the electrode pattern of the capacitance sensor. The compact nature of the LED pairs in the optical pressure sensors may make such an arrangement possible without compromising the density or effectiveness of the capacitive sensing grid. Additionally, careful routing of electrical connections to both the capacitance sensor and optical pressure sensors may ensure signal integrity while maintaining the compact form factor.

Figure 22:
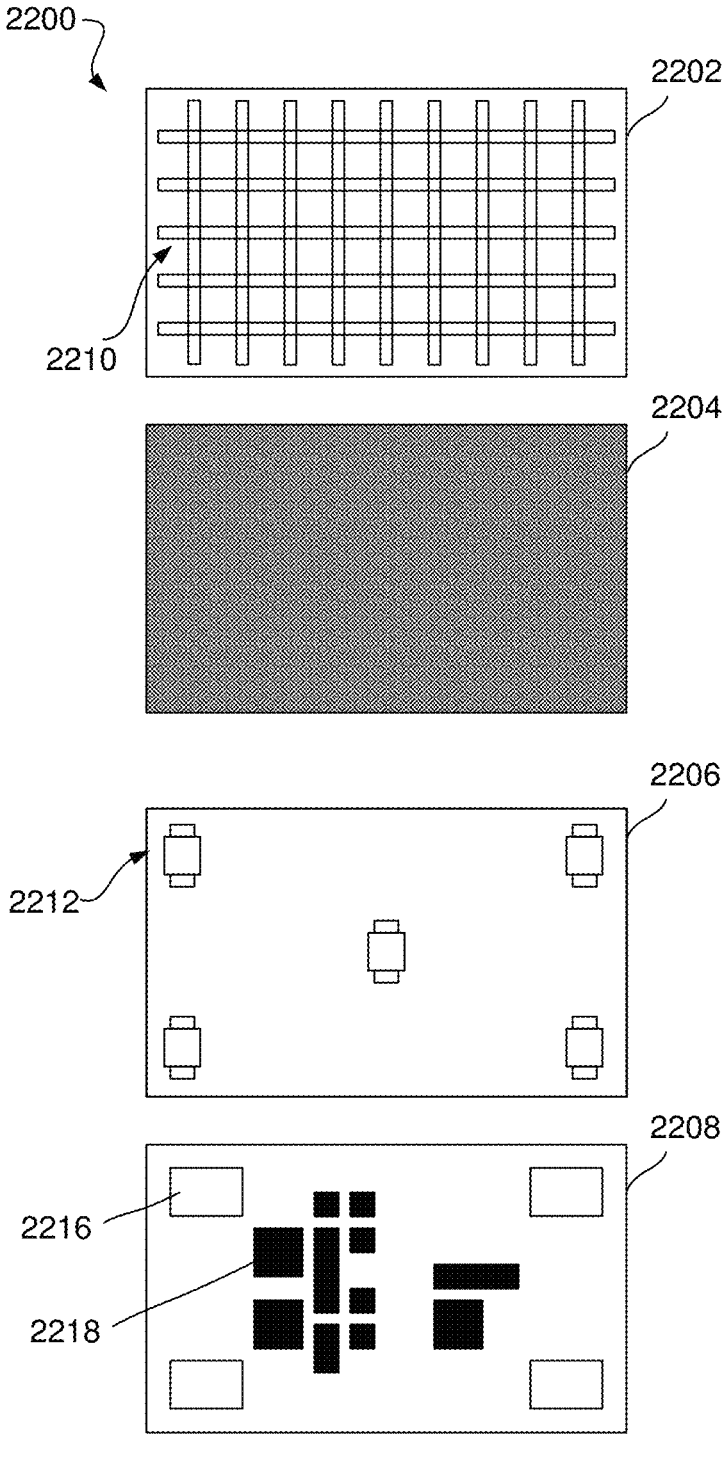
FIG. 22 depicts an example of a capacitance module in accordance with the disclosure.

FIG. 22 depicts an example of a capacitance module 2200. In this example, the capacitance module is a stack of layers including a sensor layer 2202, a shield layer 2204, an optical pressure sensor layer 2206, and a component layer 2208. The sensor layer 2202 includes a capacitance sensor 2210. The optical pressure sensor layer 2204 includes four optical pressure sensors 2212 positioned in the corners of the layer. The component layer 2208 includes components 2218 and four haptic actuators 2216.

A capacitance module which incorporates haptic actuators may use various kinds of technologies. In some examples, linear resonant actuators (LRAs) may be used to provide precise vibration feedback through oscillating masses. In other examples, piezoelectric actuators may generate a haptic feedback when voltage is applied. In other examples, haptic actuators may be LRAs, piezoelectric actuators, inductive actuators, electroactive polymer actuators, eccentric mass actuators, another type of haptic actuator, or combinations thereof.

While the component layer 2208 depicted in this example includes four haptic actuators 2216, in other examples, a different number of haptic actuators may be incorporated into a capacitance module. For example, a capacitance module may incorporate a single haptic actuator, two haptic actuators, or a different number of haptic actuators. The number of haptic actuators and the position of haptic actuators within a capacitance module may be determined based on the desired haptic effects and device specifications of the capacitance module.

Incorporating the multiple haptic actuators 2216 may enable localized haptic feedback, where the sensation of feedback can be concentrated near the location of a user input. Localized haptic feedback may enhance a user experience by providing more intuitive and responsive interactions.

When a user performs a user input on the capacitance module 2200, the capacitance sensor 2210 may first detect the user input and determine its location on a reference surface of the capacitance module. Next, the optical pressure sensors 2212 may measure the pressure of the input at the location of user input. If the measured pressure exceeds a haptic activation threshold value, the system may activate one or more haptic actuators 2216 to provide haptic feedback. This haptic feedback may simulate the sensation of a mechanical button press, even though the module may have no moving parts. The solid-state nature of this construction may improve durability and reliability of the capacitance module while maintaining a satisfying user experience.

Figure 23:
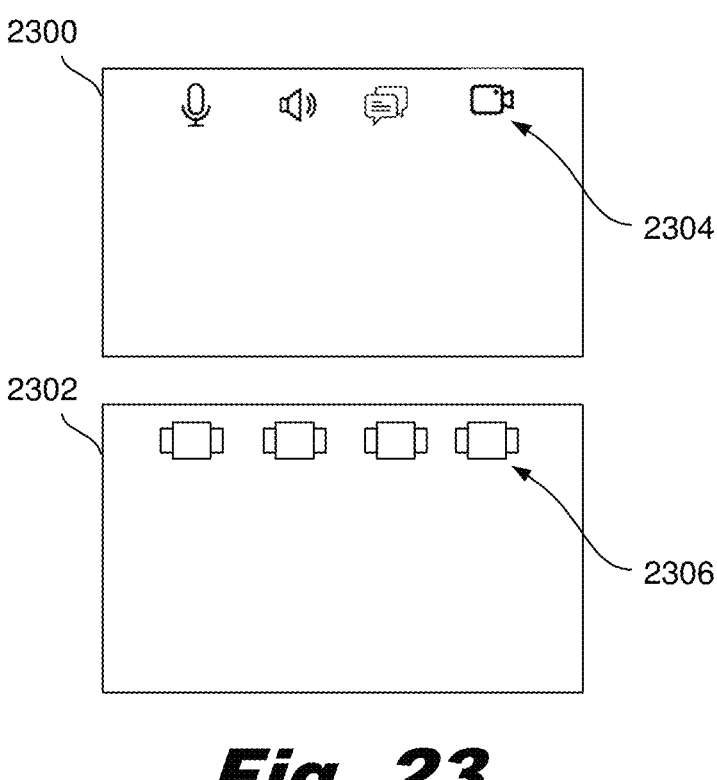
FIG. 23 depicts an example of a capacitance module in accordance with the disclosure.

FIG. 23 depicts an example of a capacitance module with a reference layer 2300 and a sensor layer 2302 adjacent to the reference layer. The reference layer includes visual indicators 2304 arranged in a row. The visual indicators may include a transparent material through which light may pass through. For example, the transparent material may form the outline of symbol for a microphone, a speaker, message bubbles, a camera, an audio volume, a screen brightness, a battery status, a power status, a call status, a microphone status, a camera status, a meeting status, a chat status, a message status, another type of status, another type of indicator, or combinations. In this example, the visual indicators 2304 may represent different input modes, including microphone, speaker, chat, and video camera functions. The visual indicators 2304 may be implemented as cutouts or translucent regions in the material of the reference layer 2300. The sensor layer 2302 may include optical pressure sensors 2306 aligned with the visual indicators 2304, enabling light from the optical pressure sensors to be visible through the visual indicators.

Figure 24:
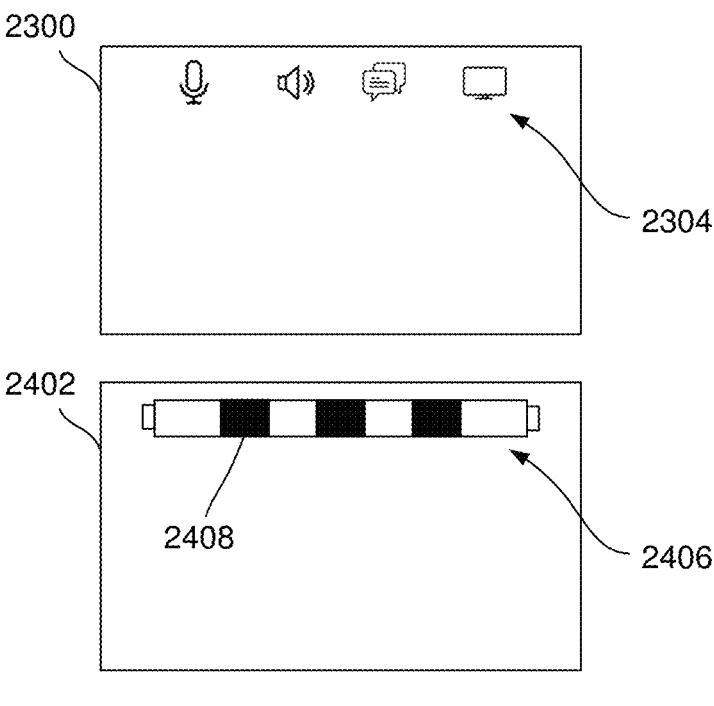
FIG. 24 depicts an example of a capacitance module in accordance with the disclosure.

FIG. 24 depicts an alternative implementation of visual indicators in a capacitance module. In this example, the reference layer 2300 is adjacent to a sensor layer 2402 with one optical pressure sensor 2406. The light pipe of the optical pressure sensor 2406 includes opaque regions aligned with the spaces between the visual indicators 2304 on the reference layer 2300.

In implementations where the visual indicators remain continuously illuminated, the transmission LEDs of the optical pressure sensors may operate at power levels sufficient to both transmit light through light pipes for pressure sensing and illuminate their respective visual indicators. The light pipes may be constructed with specific optical properties and/or geometries that allow a portion of the transmitted light to be directed upward through the visual indicators while maintaining sufficient light transmission to the measurement LEDs for reliable pressure detection.

For dynamic visual indication, where indicators are activated and deactivated selectively, the transmission LEDs may operate at lower power levels during normal pressure sensing operations, then increase their output when notification or emphasis is desired. This variable operation may be achieved while maintaining pressure sensing capabilities by ensuring that the measurement LEDs receive sufficient light for pressure detection even at lower power levels. The system may also employ temporal multiplexing, briefly alternating between pressure sensing and visual indication modes at a frequency high enough to appear continuous to users while ensuring accurate pressure measurements.

FIG. 25 and FIG. 26 depict examples of methods of using a capacitance module. These methods may be performed based on the description of the devices, modules, and principles described in relation to FIGS. 1-24*b*.

In FIG. 25, a method 2500 of using a capacitance module includes detecting 2502 a capacitance input using a capacitive measuring circuit incorporated into a stack of layers, and detecting 2504 a pressure value of the capacitance input based on deformation of the stack of layers measured by an optical pressure sensor incorporated into the stack of layers. The method 2500 may optionally include activating 2506 a haptic actuator incorporated into the stack of layers in response to the detected pressure value exceeding a haptic activation threshold value.

In FIG. 26, a method 2600 of using a capacitance module includes detecting 2602 a capacitance input using a capacitive measuring circuit incorporated into a stack of layers, measuring 2604 a plurality of pressure measurements associated with the capacitance input using a plurality of optical pressure sensors incorporated into the stack of layers, and determining 2606 a pressure value of the capacitance input based, at least in part, on the plurality of the pressure measurements. The method 2600 may optionally include determining 2608 a location of the capacitance input based, at least in part, on the plurality of pressure measurements.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
a stack of layers;
a capacitance measuring circuit disposed on at least one of the layers of the stack of layers;
the capacitance measuring circuit defines a capacitance input sensitive area associated with a face of at least one layer;
an optical pressure sensor incorporated into the stack of layers aligned within the input sensitive area; and
a controller in communication with the capacitance measuring circuit and the optical pressure sensor;
wherein the optical pressure sensor is configured to detect deformation from a user input to the stack of layers within the capacitance input sensitive area;
wherein the optical pressure sensor comprises a transmission light emitting diode (LED) and a measurement LED;
further comprising:
an occlusion element incorporated into the stack of layers;
wherein deformation of the stack of layers causes the occlusion element to progressively block light transmission between the transmission LED and the measurement LED in proportion to an amount of deformation.

2. The capacitance module of claim 1, wherein:
the capacitance measuring circuit is disposed on the first surface of the at least one layer; and the optical pressure sensor is disposed on the second surface of the at least one layer.

3. The capacitance module of claim 1, further comprising a waveguide disposed between the transmission LED and the measurement LED.

4. The capacitance module of claim 1, wherein deformation alters a direct light transmission path between the transmission LED and the measurement LED.

5. The capacitance module of claim 1, wherein deformation alters an angular relationship between the transmission LED and the measurement LED.

6. The capacitance module of claim 1, wherein the transmission LED is configured to provide illumination for a visual indicator incorporated into the stack of layers.

7. The capacitance module of claim 1, wherein the optical pressure sensor is part of a plurality of optical pressure sensors disposed within the capacitance input sensitive area.

8. The capacitance module of claim 7, wherein the controller is configured to:
receive at least one signal from the plurality of optical pressure sensors; and determine a location of the user input based on pressure measurements from the plurality of optical pressure sensors.

9. The capacitance module of claim 1, further comprising a shield disposed between the capacitance measuring circuit and the optical pressure sensor.

10. The capacitance module of claim 1, wherein the capacitance measuring circuit is configured to detect a location of the user input and the optical pressure sensor is configured to determine a pressure value of the user input.

11. The capacitance module of claim 1, further comprising:
a haptic actuator incorporated into the stack of layers;
wherein the processor is configured to activate the haptic actuator in response to a pressure measurement from the optical pressure sensor.

12. A method of using a capacitance module, comprising:
detecting a capacitance input using a capacitive measuring circuit incorporated into a stack of layers; and
detecting a pressure value of the capacitance input based on deformation of the stack of layers measured by an optical pressure sensor incorporated into the stack of layers;
wherein the optical pressure sensor comprises a transmission light emitting diode (LED) and a measurement LED;
further comprising:
an occlusion element incorporated into the stack of layers;
wherein deformation of the stack of layers causes the occlusion element to progressively block light transmission between the transmission LED and the measurement LED in proportion to an amount of deformation.

13. The method of claim 12, further comprising:
activating a haptic actuator incorporated into the stack of layers in response to the detected pressure value exceeding a haptic activation threshold value.

14. The method of claim 12, further comprising:
measuring a plurality of pressure measurements associated with the capacitance input using a plurality of optical pressure sensors incorporated into the stack of layers; and
determining a pressure value of the capacitance input based, at least in part, on the plurality of pressure measurements.

15. The method of claim 14, further comprising:
determining a location of the capacitance input based, at least in part, on the plurality of pressure measurements.

16. A computer-program product for using a capacitance module, the computer-program product comprising a non-transitory computer-readable medium storing instruction executable by a processor to:
determine a location of capacitance input based on an input from a capacitive measuring circuit incorporated into the capacitance module; and determine a pressure value of the capacitance input based on an input from an optical pressure sensor incorporated into the capacitance module;

wherein the optical pressure sensor is configured to detect deformation from a user input to the stack of layers within the capacitance input sensitive area;

wherein the optical pressure sensor comprises a transmission light emitting diode (LED) and a measurement LED;

further comprising:

an occlusion element incorporated into the stack of layers;

wherein deformation of the stack of layers causes the occlusion element to progressively block light transmission between the transmission LED and the measurement LED in proportion to an amount of deformation.

17. The computer-program product of claim 16, wherein the instructions are further executable by a processor to:

activate a haptic actuator incorporated into the capacitance module in response to the determined pressure value exceeding a haptic activation threshold value.

18. The computer-program product of claim 16, wherein determining the pressure value includes analyzing inputs from the optical pressure sensor and from at least one additional pressure sensor that is also incorporated into the capacitance module.

\* \* \* \* \*